(12) United States Patent
Flegel

(10) Patent No.: US 8,563,883 B1
(45) Date of Patent: Oct. 22, 2013

(54) TRANSFER SWITCH WITH COVER-MOUNTED POWER INLET

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 47 days.

(21) Appl. No.: 13/326,900

(22) Filed: Dec. 15, 2011

(51) Int. Cl.
*H01H 9/20* (2006.01)

(52) U.S. Cl.
USPC ........................................ 200/50.02; 439/131

(58) Field of Classification Search
USPC .............. 200/50.02, 297, 51 R, 50.28, 50.29, 200/50.3, 50.31, 51.12, 333, 293, 308; 439/131, 535, 139; 174/48, 59, 53, 55, 174/57; 361/643, 610
See application file for complete search history.

(56) References Cited

U.S. PATENT DOCUMENTS

| | | | |
|---|---|---|---|
| 3,972,579 A | 8/1976 | Kohaut | |
| 5,122,069 A | 6/1992 | Brownlie et al. | |
| 5,342,993 A | 8/1994 | Siems | |
| 5,575,668 A | 11/1996 | Timmerman | |
| 5,761,027 A * | 6/1998 | Flegel | 361/664 |
| 5,984,719 A | 11/1999 | Flegel | |
| 6,028,267 A | 2/2000 | Byrne | |
| 6,046,405 A | 4/2000 | Obermann | |
| 6,085,667 A | 7/2000 | Gevaert et al. | |
| 6,121,897 A | 9/2000 | Flegel | |
| 6,290,518 B1 * | 9/2001 | Byrne | 439/131 |
| 6,534,735 B1 | 3/2003 | Czarnecki | |
| 6,674,031 B1 | 1/2004 | Flegel | |
| 8,287,292 B2 * | 10/2012 | Byrne | 439/131 |
| 8,395,884 B1 * | 3/2013 | Czarnecki | 361/643 |

OTHER PUBLICATIONS

"Pro/Tran(R) Manual Transfer Switches for Portable Generators", Reliance Controls Corporation, 2001 Young Court, Racine, WI 53404, 2003.
"Pro/Tran(R)—CSR Series Manual Transfer Switches", Reliance Controls Corporation, 2001 Young Court, Racine, WI 53404, undated.
"Pro/Tran(R)—'Signa' Series Manual Transfer Switches for Traffic Signal Applications", Reliance Controls Corporation, 2001 Young Court, Racine, WI 53404, undated.

* cited by examiner

*Primary Examiner* — Edwin A. Leon
(74) *Attorney, Agent, or Firm* — Boyle Fredrickson, S.C.

(57) ABSTRACT

A transfer switch for interconnection in a power supply system for an electrical load, such as a traffic signal, for selectively switching between primary and alternate power sources. The transfer switch includes a housing having a cover that is movable between open and closed positions for selectively providing access to an interior. An input receptacle is configured to engage an electrical connector of the alternate power source. The input receptacle is movable between a first position for facilitating engagement of the connector with the receptacle when the cover is open, and a second position when the cover closed. A selector switch is contained within the interior and interconnected with the load and the primary and alternate power sources. The selector switch selectively connects the primary power source and the alternate power source to the load, and the cover prevents access to the selector switch when the cover is closed.

22 Claims, 7 Drawing Sheets

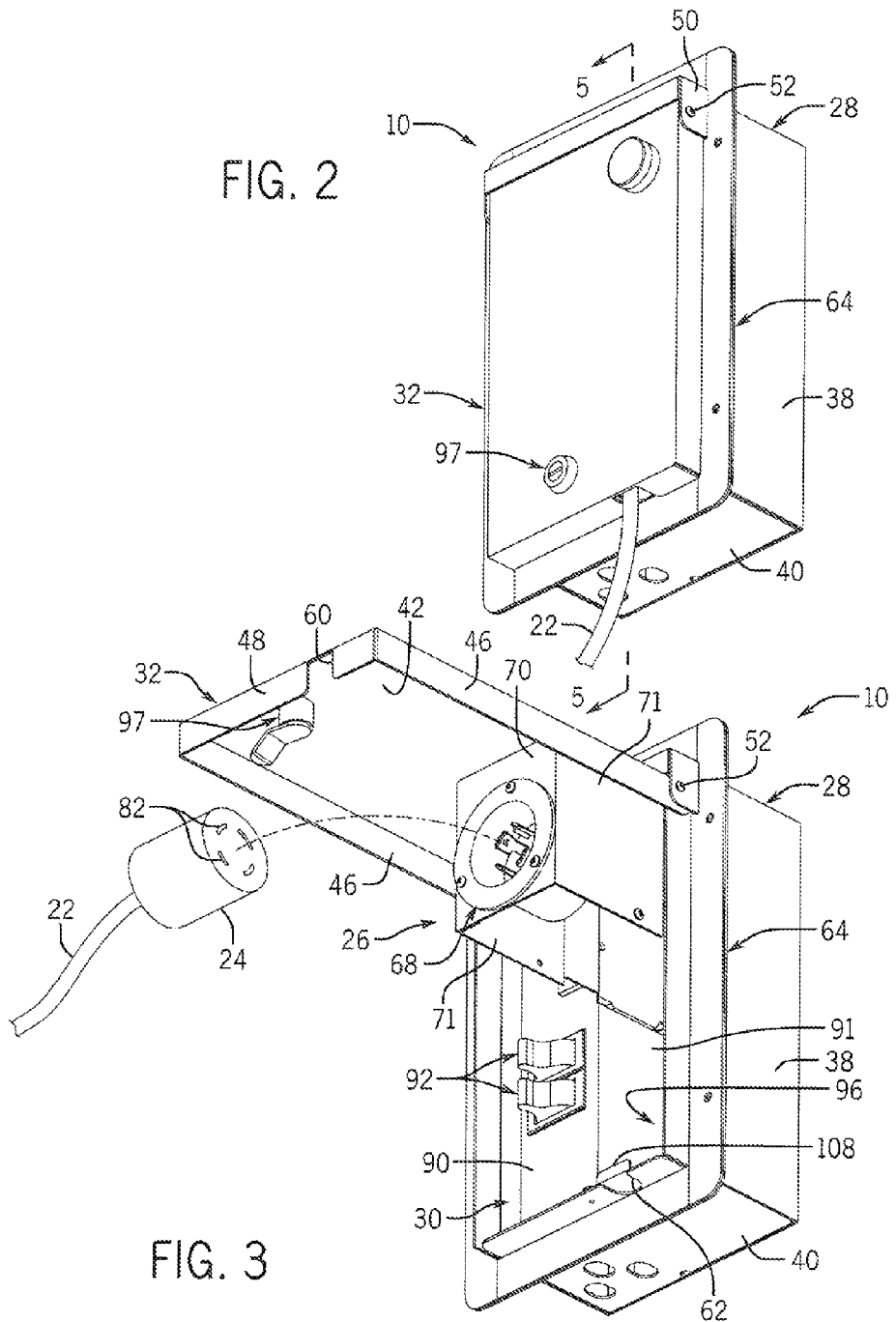

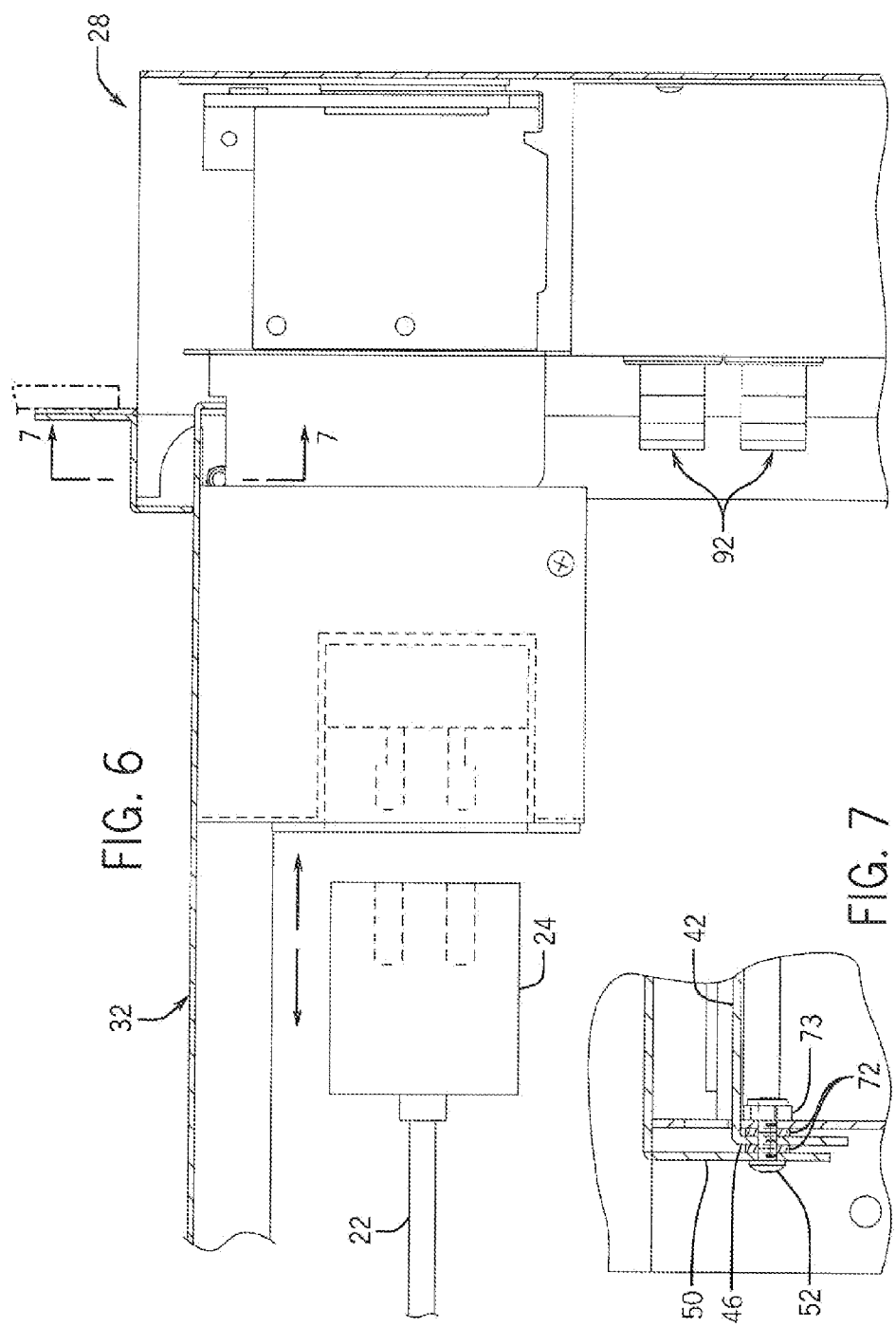

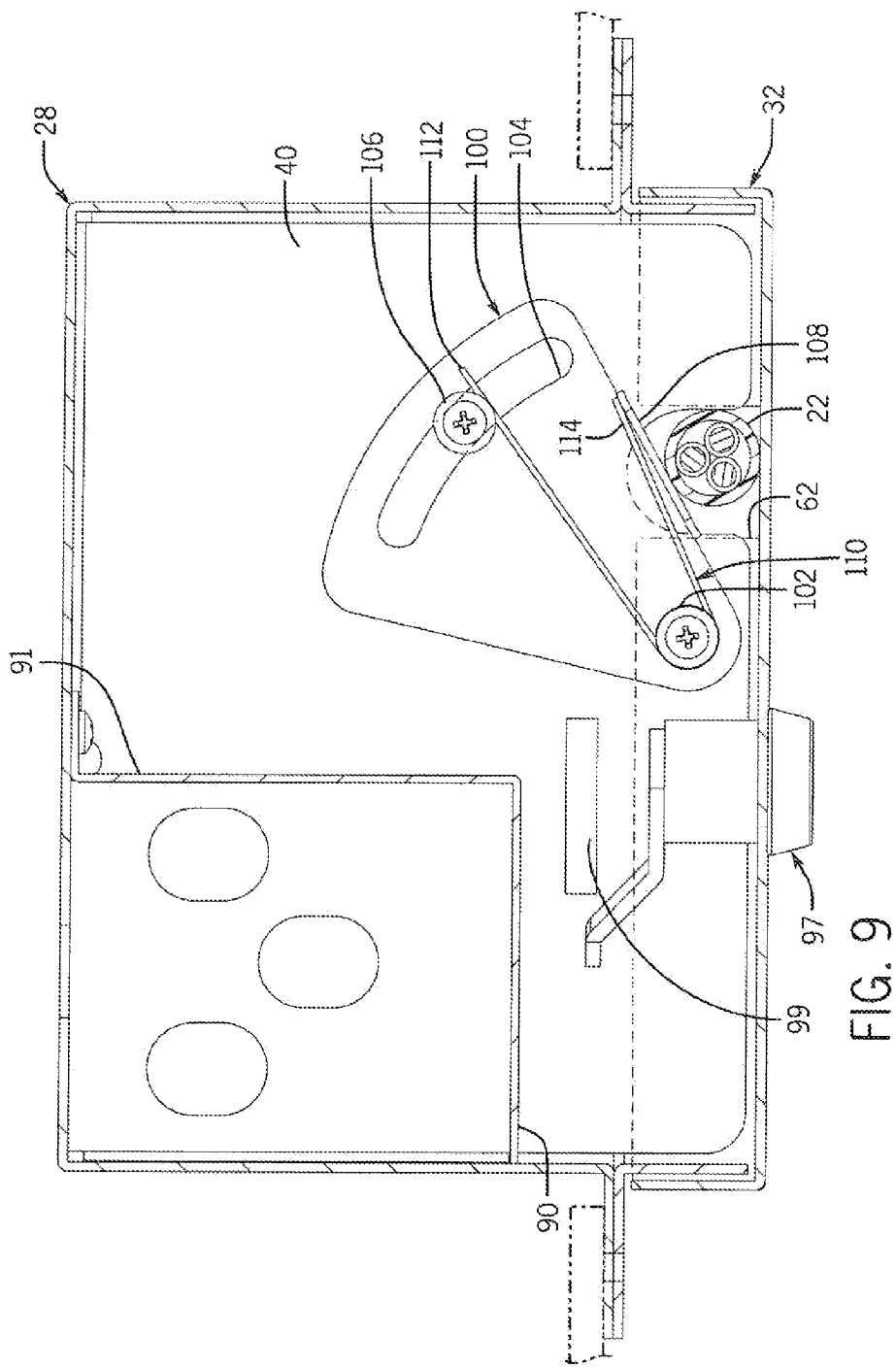

TRANSFER SWITCH WITH COVER-MOUNTED POWER INLET

BACKGROUND AND SUMMARY

This invention relates to transfer switch devices used to change the supply of electrical power between a primary power source and an auxiliary power source. More particularly, the invention relates to a dedicated transfer switch for use with an electrical load, such as a traffic signal, that allows an alternate power source to be connected to the load when the primary power source is interrupted.

A transfer switch assembly is commonly used to change the supply of electrical power from a primary power source to an auxiliary source when the primary power source is interrupted for any reason. While a brief interruption is sometimes tolerable for some devices or loads, for others, an alternative means for providing power when the primary power source is inoperable is desired. A transfer switch assembly provides a way to quickly and efficiently connect an auxiliary power supply to an electrical device or load in order to eliminate a lengthy interruption.

Typically, a dedicated transfer switch assembly includes a housing within which an input receptacle is contained. The input receptacle engages with an electrical connector that extends from and is associated with an auxiliary power source, such as an electrical generator. In a typical construction, the housing has a cover or access panel that can be moved between an open position and a closed position. The housing and the cover are configured to provide a weatherproof construction, which prevents rain and other moisture from entering the interior of the housing when the cover is closed. The housing and the cover are typically formed so as to define a downwardly-facing opening, and the cord is positioned within the opening when the cover is closed. The input receptacle is also positioned so as to face downwardly, which provides moisture-free engagement of the connector with the receptacle. While this construction is generally satisfactory and provides moisture-proof engagement of the connector with the input receptacle, it is disadvantageous because the downwardly-facing input receptacle makes it difficult for the user to engage the connector with the input receptacle. This problem is compounded when it is necessary to position the connector in a predetermined angular relationship relative to the input receptacle before the connector can be engaged with the input receptacle.

It is an object of the present invention to provide a transfer switch arrangement that facilitates engagement of a connector associated with an auxiliary power supply with an input receptacle associated with the transfer switch arrangement. It is another object of the invention to provide such a transfer switch arrangement that automatically positions the input receptacle in an easy access position when the cover of the housing is moved to the open position. It is a further object of the invention to provide such a transfer switch arrangement that can be used in a variety of applications, such as with a traffic signal. It is another object of the invention to provide such a transfer switch arrangement which is relatively simple and straightforward in construction and operation, yet which provides significant advantages in use by facilitating engagement of a power supply connector with the input receptacle or the like.

In accordance with the present invention, a transfer switch arrangement for selectively switching power between a primary power source and an auxiliary power source having a connector includes a housing having a cover that is movable between an open position and a closed position for selectively providing access to an interior defined by the housing, and a selector switch contained within the interior of the housing to selectively connect and disconnect the primary power source and the auxiliary power source. An input receptacle is configured to engage the connector of the auxiliary power supply. The input receptacle is movably interconnected with the housing for movement between a first position for facilitating engagement of the connector with the receptacle when the cover is in the open position, and a second position when the cover is in the closed position. The input receptacle may be interconnected with the housing for pivoting movement between the first position and the second position. The input receptacle is preferably interconnected with the cover, and is movable between the first position and the second position in response to movement of the cover between the open position and the closed position.

In one embodiment, the input receptacle is secured to and carried by the cover. The cover defines an inner surface that in part defines the interior of the housing when the cover is in the closed position, and the input receptacle is secured to the inner surface of the cover. The inner surface of the cover defines an upper area and a lower area, and the input receptacle is secured to the inner surface of the cover at the upper area of the cover. The cover cooperates with the housing to define an opening when the cover is in the closed position, and the opening is configured to receive a flexible power supply cord extending from and interconnected with the power supply connector.

The cover may have a bottom flange with a first retainer notch, and the housing may have a bottom wall with a second retainer notch that cooperates with the first retainer notch, for receiving the flexible power supply cord. A movable biased filler member may be interconnected with the housing, and is biased toward a closed position over the opening when there is no power supply cord in the opening. The filler member is movable to an open position when a power supply cord is present in the opening.

The transfer switch arrangement may include a friction arrangement for selectively maintaining the cover in the open position, and thereby selectively maintaining the input receptacle in the first position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is an isometric view of the transfer switch arrangement of FIG. 1, showing a cover of the transfer switch housing in a closed position;

FIG. 3 is a view similar to FIG. 2, showing the cover of the transfer switch housing in an open position and a power input receptacle associated with the transfer switch housing in an outwardly facing engagement position for facilitating engagement with a connector at the end of a flexible cord;

FIG. 6 is a partial enlarged section view of a portion of the transfer switch housing and cover as shown in FIG. 5, showing the cover in the open position and showing engagement of the connector;

FIG. 7 is a partial section view taken along line 7-7 of FIG. 6, showing a friction arrangement between the cover and the transfer switch housing for maintaining the cover in the open position;

FIG. 9 is a section view taken along line 9-9 of FIG. 5, showing a movable biased filler member interconnected with the housing and in an open position with a flexible cord present in the opening.

DETAILED DESCRIPTION

Figure 1:
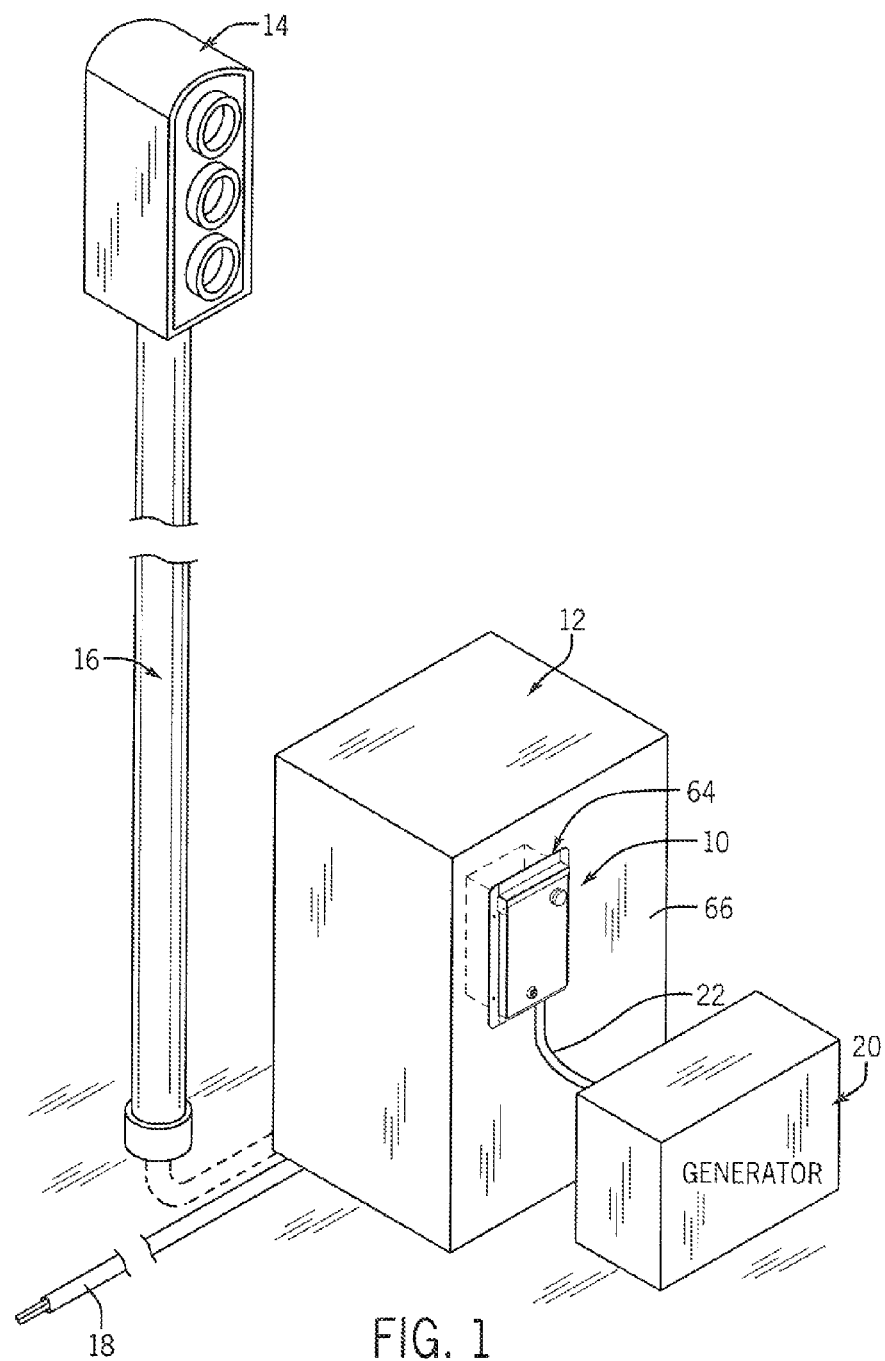
FIG. 1 is an isometric view illustrating an application of a transfer switch arrangement, in accordance with the present invention, attached to a traffic signal control box normally powered by an electric utility source and an auxiliary power source connected to the traffic signal control box for supplying power in the event of an interruption in the electric utility source.

Referring to FIG. 1, a transfer switch arrangement may be employed in an application in which the transfer switch arrangement consists of a transfer switch assembly 10 which is mounted to a control box 12 of a traffic signal 14. The control box 12 includes components for controlling the sequencing and timing of a traffic signal 14 which is secured to the top of a pole 16 and anchored to the ground. A main power cable 18 that normally supplies power to the traffic signal 14 runs through and from the support pole 16 and underground to the control box 12. In the event of a power outage, electrical power is supplied to the traffic signal 14 from an auxiliary power source, such as a generator 20 located adjacent to control box 12, through a cord 22 having a connector 24 (FIG. 3) at its end that is configured for engagement with a power input receptacle 26 (also shown in FIG. 3) located within transfer switch assembly 10. It is understood, however, that this is simply a representative example of a suitable application for a transfer switch assembly, and that transfer switch assembly 10 may be used in any other application in which a connector 24 is adapted for engagement with a power input receptacle 26 for switching power between a primary power source and an auxiliary power source.

While transfer switch assembly 10 is shown to be mounted within the control box 12, it is understood that transfer switch assembly 10 may also be mounted outside of control box 12. Also, transfer switch assembly 10 does not need to be located adjacent its electrical load but can be located at any point along the path of the power supply to the load.

Referring to FIGS. 2-5, transfer switch assembly 10 generally includes a housing 28 defining an interior 30, a cover 32 that is movably mounted to housing 28, and a power input receptacle 26 that is movable relative to housing 28. Transfer switch assembly 10 is adapted for use in any application in which power is to be supplied and switched between a primary power source and an auxiliary power source.

Housing 28 of transfer switch assembly 10 includes a series of walls that define interior 30, including a top wall 34, a rear wall 36, a pair of sidewalls 38, and a bottom wall 40. Cover 32 includes a front panel 42, a pair of side flanges 46, and a bottom flange 48. Top wall 34 of housing 28 includes a downwardly extending flange 50 overlapping the upper end of front panel 42 when cover 32 is in the closed position, and partially overlapping the upper front end of sidewalls 38. Housing 28 further defines an open front area, which establishes communication between housing interior 30 and the exterior of housing 28. Cover 32 is configured to enclose the open front area of housing 28, such that access to the housing interior 30 is prevented when cover 32 is in the closed position, and is allowed when cover 32 is in the open position.

Figure 4:
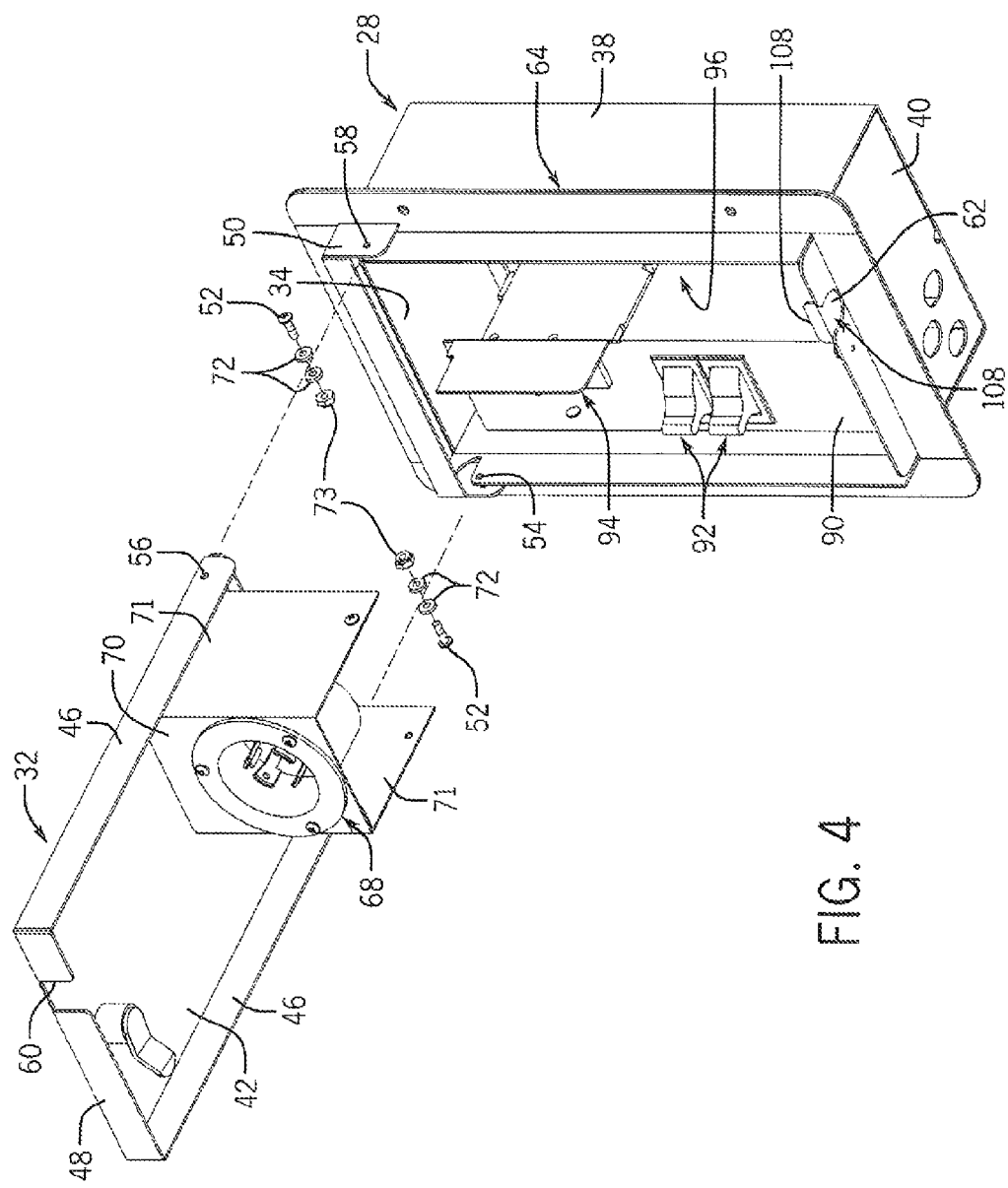
FIG. 4 is an exploded isometric view illustrating the transfer switch arrangement of FIGS. 2 and 3, showing the cover disengaged from the transfer switch housing.
Figure 5:
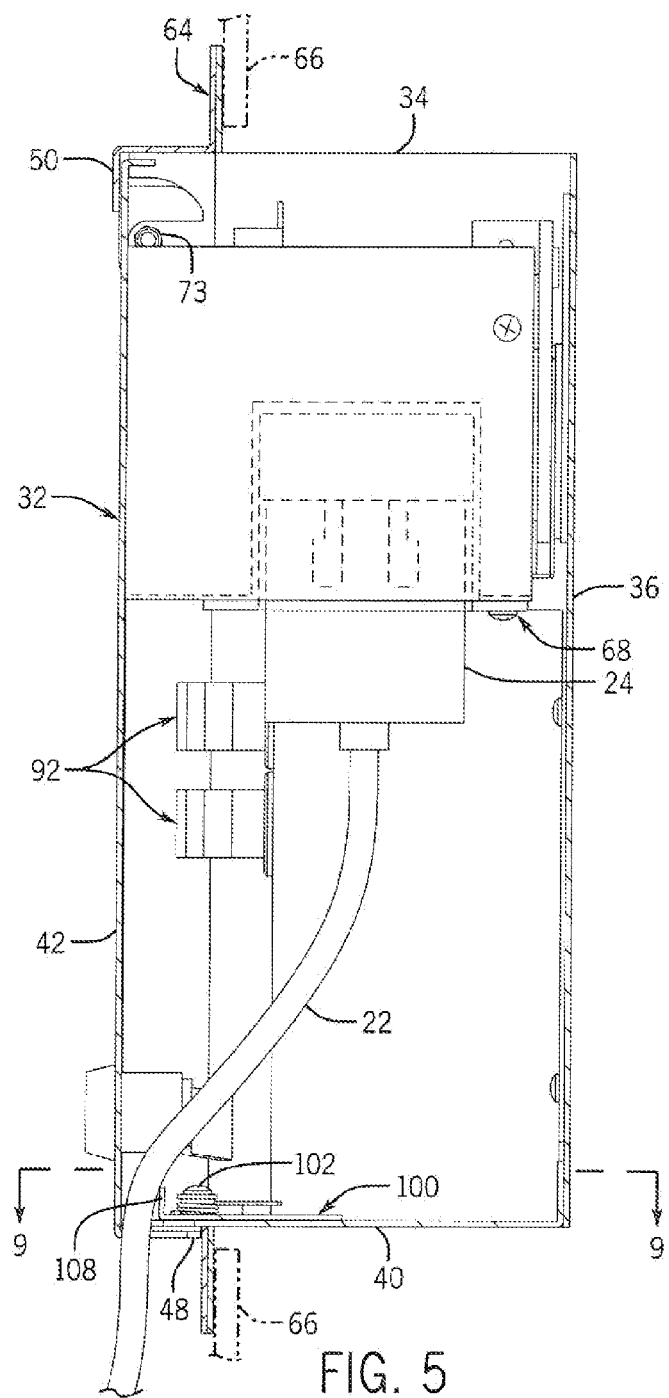
FIG. 5 is a section view taken along line 5-5 of FIG. 2, in which the cover of the transfer switch housing in the closed position.

As shown in FIGS. 4 and 5, cover 32 is mounted to housing 28 for pivoting movement between the open and closed positions by means of a pair of pivot pins 52, each of which extends outwardly from one of the housing sidewalls 38. Each pivot pin 52 is engaged within one of a first pair of pin holes 54 formed at an upper forward corner of one of sidewalls 38, and within one of a second pair of pin holes 56 formed at an upper end area of one of side flanges 46, and further within one of a third pair of pin holes 58 formed at an end area of one of the side portions of downwardly extending flange 50. The pair of sidewalls 38 overlaps the pair of side flanges 46 when cover 32 is in the closed position. Similarly, bottom wall 40 overlaps bottom flange 48 when cover 32 is in the closed position. In this manner, the construction of the walls of housing 28 and the flanges of cover 32 prevent moisture such as rain and snow from entering the housing interior 30.

Cover 32 cooperates with the housing 28 to define an opening when the cover 32 is in the closed position, which is configured to receive a flexible cord 22 extending from and interconnected with the power supply connector 24. In a representative embodiment, bottom flange 48 of cover 32 has a first retainer notch 60, and bottom wall 40 of housing 28 has a second retainer notch 62, each of which at least partially defines the opening. First retainer notch 60 aligns with second retainer notch 62 when cover 32 is in the closed position to define the opening. First retainer notch 60 and second retainer notch 62 receive cord 22 so that the presence of cord 22 does not inhibit cover 32 from moving to the closed position.

A peripheral mounting flange 64 may be interconnected with housing 28 for mounting into a control box wall, such as shown at 66 (FIG. 1). Mounting flange 64 of transfer switch box 10 may be configured to provide a flush mount construction, in which an opening is formed in control box wall 66 and housing 28 is fully positioned within the interior of the control box 12. Alternatively, mounting flange 64 of transfer switch box 10 may be configured to provide a semi-flush mount construction, in which an opening is formed in control box wall 66 and housing 28 is partially positioned within the interior of the control box 12. In addition, transfer switch box 10 may be secured to control box 12 using a surface mount construction, in which housing 28 of transfer box 10 is fully outside of control box 12. A mounting flange such as 64 may be used in an application such as this or, alternatively, rear surface 36 of housing 28 may be fastened directly to the exterior surface of wall 66 of control box 12.

In accordance with the present invention, power input receptacle 26 is movable to different positions relative to housing 28. Specifically, power input receptacle 26 is movable between an outwardly facing engagement position in which power input receptacle 26 faces outwardly relative to housing interior 30, and a downwardly facing use position in which power input receptacle 26 faces downwardly within housing interior 30. It is understood, however, that power input receptacle 26 may also be movable between other positions relative to housing 28, as desired. The outwardly facing engagement position of power input receptacle 26 facilitates engagement of connector 24 with power input receptacle 26. The downwardly facing use position of power input receptacle 26 ensures that the connection between connector 24 and power input receptacle 26 faces downwardly and is shielded from moisture that may drip downwardly within housing interior 30, e.g., from rain, snow, or condensation.

Power input receptacle 26 is movable between the engagement and use positions by movement of cover 32 between the open and closed positions. In this manner, power input receptacle 26 is automatically moved to the outwardly facing engagement position when the user moves cover 32 to the open position, and to the downwardly facing use position when the user moves cover 32 to the closed position.

In the illustrated embodiment, power input receptacle 26 is secured to and carried by cover 32, such that power input receptacle 26 moves to the outwardly facing engagement position along with cover 32 when cover 32 is moved to the open position, and power input receptacle 26 moves to the downwardly facing use position along with cover 32 when cover 32 is moved to the closed position. In a representative construction, power input receptacle 26 includes a socket 68 for engaging an electrical connector 24 associated with the alternate power source, and the socket 68 is secured to a socket mounting front wall 70 that extends inwardly from the inner surface of the cover 32. The socket mounting front wall 70 is configured so that the socket 68 faces downwardly when the cover 32 is in the closed position and faces outwardly when the cover 32 is in the open position. Socket 68 is further supported by a pair of socket mounting side walls 71 which, like socket mounting front wall 70, are interconnected with and extend inwardly from cover front panel 42.

In this embodiment, power input receptacle 26 is moved throughout a range of movement that corresponds exactly to the range of movement of cover 32 when cover 32 is moved between the open and closed positions. That is, power input receptacle 26 faces vertically downwardly when cover 32 is positioned vertically in the closed position, and faces horizontally outwardly when cover 32 is positioned horizontally in the open position.

A friction arrangement, as shown in FIGS. 4-7, is interposed between housing 28, the upper end of cover 32, and downwardly facing flange 50 for selectively maintaining cover 32 in the open position, in a hands-free manner. In the illustrated embodiment, the friction arrangement includes a pair of friction washers 72, each of which is engaged with one of the pair of pivot pins 52 located at the upper forward corner of each housing sidewall 38. The friction arrangement allows the cover 32 to remain in place when cover 32 is moved to an open position by applying an upward force so that cover 32 is pivoted upwardly (in a clockwise direction). It should be understood that the friction washers 72 may retain cover 32 in any desired orientation when cover 32 is moved from the closed position toward the open position or from the open position toward the closed position. Representatively each pin 52 may be in the form of a threaded screw, and a lock nut 73 is engaged with the threads of each pin 52. In this manner, pin 52 and nut 53 can be tightened together in order to provide friction washers 72 with the desired degree of frictional engagement between housing 28 and cover 32.

As noted previously, power input receptacle 26 is secured to cover 32 such that power input receptacle 26 is in a generally horizontal, outwardly facing orientation that corresponds to the orientation of cover 32 when cover 32 is in the open position. In this manner, the outer engagement area of power input receptacle 26, which is illustrated as having a male configuration including a set of prongs 80, faces outwardly so as to be visible and easily accessible by a user when cover 32 is open. It should be understood, however, that any other satisfactory mating engagement arrangement may be employed. When power input receptacle 26 is positioned in this manner, the user can quickly and easily position connector 24 relative to the engagement area of power input receptacle 26, such that the engagement area of connector 24, which is illustrated as including prong recesses 82, can be aligned with the engagement area of power input receptacle 26. Typically, connector 24 and power input receptacle 26 include a twist-type connection that prevents disengagement of connector 24 from power input receptacle 26 upon application of an axial outward force on cord 22, to prevent inadvertent disengagement of connector 24 from power input receptacle 26 after engagement of connector 24 with power input receptacle 26.

Once connector 24 is engaged with power input receptacle 26, the user returns cover 32 to the closed position by applying a downward force on cover 32 so that cover 32 is then pivoted downwardly (in a counter-clockwise direction) to the closed position as shown in FIGS. 2 and 5. When cover 32 is moved to the closed position, cord 22 is positioned within the first retainer notch 60 and the second retainer notch 62 which cooperates to define an opening, so that the presence of cord 22 does not obstruct movement of cover 32 to the closed position.

It can thus be appreciated that transfer switch box 10 as shown and described provides a construction that greatly facilitates engagement of connector 24 with power input receptacle 26, by providing a movable power input receptacle 26 that enables the engagement area of power input receptacle 26 to be placed in an outwardly facing orientation when cover 32 is moved to the open position. When cover 32 is moved to the closed position, the components of transfer switch box 10 assume a configuration generally similar to that of a conventional transfer switch box that includes a power input receptacle 26 that is fixed in position to an internal wall of the transfer switch box.

Figure 8:
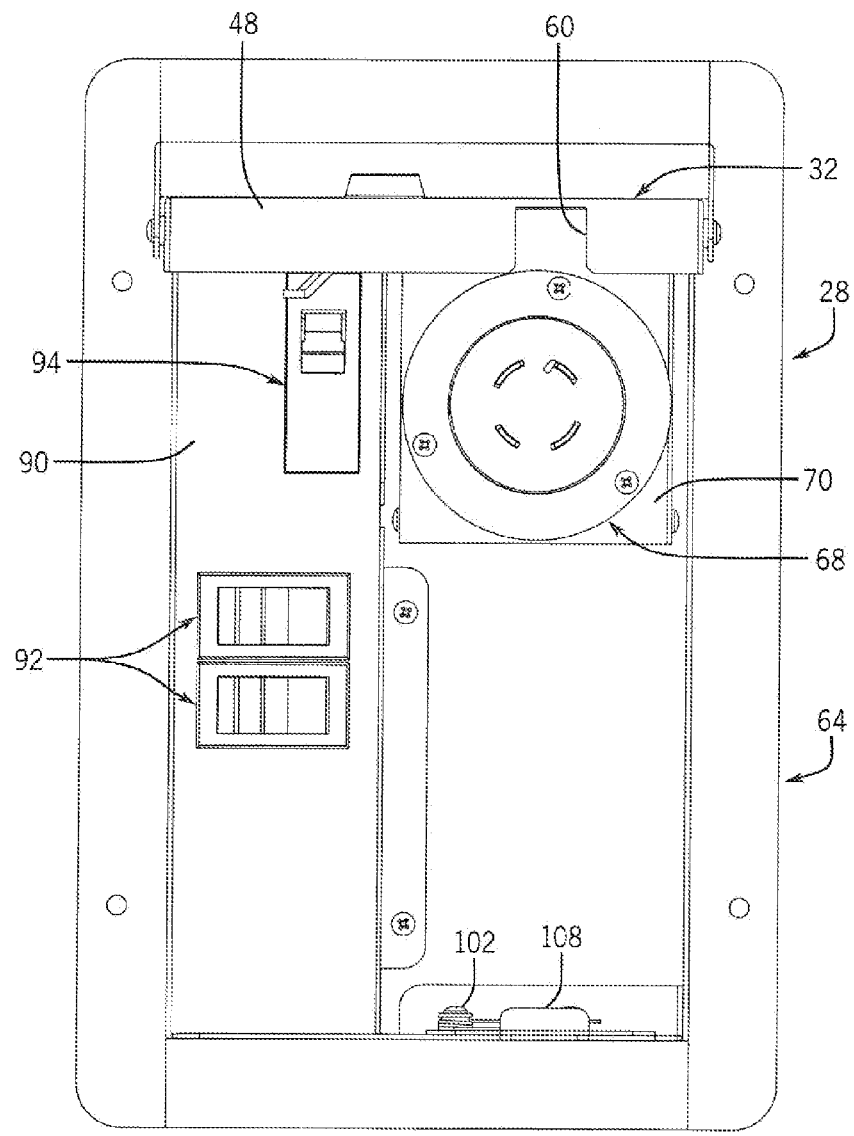
FIG. 8 is a front elevation view of the transfer switch arrangement showing the interior of the transfer switch housing when the cover is in an open position.

Referring to FIG. 8, the housing interior 30 includes an outwardly facing wall 90 and an interior sidewall 91, which cooperate to form a switch compartment within housing interior 30. A pair of selector switches 92 may be secured to the wall 90 of housing 28, to provide selective connection the electrical load with either the primary power source or the alternate power source. A circuit breaker 94 may also be secured to wall 90 of housing 28, to provide overcurrent protection for power supplied from generator 20. If desired, a power meter may be employed in order to provide a visual indication as to the supply of power through the transfer switch arrangement.

The housing interior 30 also includes a recess 96 adjacent to the outwardly facing wall 90 and defined in part by interior sidewall 91, which receives the power input receptacle 26 when the cover 32 is in the closed position and the power input receptacle 26 is in the downwardly-facing use position. Cover 32 defines an inner surface that in part defines the interior 30 of the housing 28 when the cover 32 is in the closed position. Cover 32 is configured not only to overlie housing 28 but also to cover interior 30 when cover 32 is in the closed position. Therefore, cover 32 prevents access to the selector switches 92 and the circuit breaker 94 when cover 32 is in the closed position. Cover 32 may be fitted with a lock assembly 97 to selectively prevent movement of cover 32 away from the closed position. The lock assembly 97 may be of conventional construction, and may have a movable locking member that is movable into and out of a slot 99 (FIG. 9) in the bottom wall 40 of housing 28 to selectively enable and disable movement of cover 32.

FIG. 9 illustrates a closure feature of the present invention, in the form of a movable biased filler member 100 that is normally positioned over the opening of the second retainer notch 62 when there is no cord 22 in the opening. The filler member 100 may be in the form of a generally triangular plate member that overlies the upper surface of bottom wall 40 of housing 28. Filler member 100 is pivotable between open and closed positions about a pivot axis defined by a screw 102 that extends through an opening in filler member 100 and into an aligned opening in bottom wall 40. An arcuate slot 104 is formed in filler member 100, and a screw 106 extends through arcuate slot 104 into engagement with a threaded opening in bottom wall 40. In this manner, filler member 100 is pivotable throughout a range of movement defined by engagement of screw 106 with the ends of slot 104.

Filler member 100 further includes a lip 108, which is positioned in line with notch 62. A torsion spring 110 biases filler member 100 to a closed position in which it overlies the opening defined by notch 62. A torsion spring 110 includes a first leg 112 that bears against screw 106 and a second leg 114 that bears against the inside surface of lip 108. Torsion spring 110 thus biases filler member 100 toward a closed position in which it overlies the opening of notch 62 and lip 108 is generally in line with the front edge of bottom wall 40 of housing 28.

In operation, the filler member 100 is movable to an open position when cord 22 is present in the opening. To accomplish this, the user positions cord 22 against lip 108 as cover 32 is moved toward its closed position. Continued movement of cover 32 causes cord 22 to be received within notch 60 of cover 32, and the inside surface of cover front panel 42 pushes cord 22 into the opening of notch 62. This causes cord 22 to engage lip 108 and move filler member 100 inwardly, as shown in FIG. 9, against the bias of torsion spring 110. Filler member 100 thus occupies a portion of the opening defined by notch 62 when cover 32 is closed and cord 22 is present. When cord 22 is withdrawn from the opening defined by notch 62, torsion spring 110 automatically moves filler member 100 back to its closed position in which it overlies the opening of notch 62, to close the opening when cord 22 is not present. This feature prevents moisture from entering the housing interior 30 when cord 22 is not present, and also blocks off an opening that otherwise would be accessible to bugs, insects, vermin, etc.

It can be appreciated that the present invention thus provides a relatively simple, economical and secure power inlet which quickly and efficiently allows engagement of a connector, such as from an alternate power source, to be connected to an electrical load when the primary power source is interrupted.

Various alternatives and embodiments are contemplated as being within the scope of the following claims particularly pointing out and distinctly claiming the subject matter regarded as the invention.

I claim:

1. A transfer switch arrangement adapted for interconnection in a power supply system for an electrical load, for selectively switching power to the electrical load between a primary power source and an alternate power source, the transfer switch comprising:
   a housing having a cover that is movable between an open position and a closed position for selectively providing access to an interior defined by the housing;
   an input receptacle configured to engage an electrical connector of the alternative power source, wherein the input receptacle is movably interconnected with the housing for movement between a first position for facilitating engagement of the connector with the receptacle when the cover is in the open position, and a second position when the cover is in the closed position; and
   a selector switch contained within the interior of the housing and interconnected with the electrical load, the primary power source and the alternate power source, wherein the selector switch is operable to selectively connect and disconnect the primary power source and the alternate power source with respect to the electrical load, and wherein the cover prevents access to the selector switch when the cover is in the closed position.

2. The transfer switch arrangement of claim 1, wherein the input receptacle is interconnected with the housing for pivoting movement between the first position and the second position.

3. The transfer switch arrangement of claim 2, wherein the input receptacle is interconnected with the cover, and is movable between the first position and the second position in response to movement of the cover between the open position and the closed position.

4. The transfer switch arrangement of claim 3, wherein the input receptacle is secured to and carried by the cover.

5. The transfer switch arrangement of claim 4, wherein the cover defines an inner surface that in part defines the interior of the housing when the cover is in the closed position, and wherein the input receptacle is secured to the inner surface of the cover.

6. The transfer switch arrangement of claim 5, wherein the inner surface of the cover defines an upper area and a lower area, wherein the input receptacle is secured to the inner surface of the cover at the upper area of the cover, and wherein the cover cooperates with the housing to define an opening when the cover is in the closed position, wherein the opening is configured to receive a flexible power supply cord extending from and interconnected with the power supply connector.

7. The transfer switch arrangement of claim 6, wherein the cover includes a bottom flange, and wherein the bottom flange has a first retainer notch that at least partially defines the opening.

8. The transfer switch arrangement of claim 7, wherein the housing includes a bottom wall, wherein the bottom wall has a second retainer notch that cooperates with the first retainer notch to define the opening.

9. The transfer switch arrangement of claim 8, wherein the bottom flange of the cover overlaps the bottom wall of the housing when the cover is in the closed position, wherein the first retainer notch of the bottom flange aligns with the second retainer notch of the bottom wall to form the opening.

10. The transfer switch arrangement of claim 8, further comprising a movable biased filler member interconnected with the housing, wherein the biased filler member is biased toward a closed position over the opening when there is no power supply cord in the opening, and is movable to an open position when a power supply cord is present in the opening.

11. The transfer switch arrangement of claim 3, wherein the cover is pivotably interconnected with the housing for movement between the first position and the second position, and further comprising a friction arrangement for selectively maintaining the cover in the open position and thereby selectively maintaining the input receptacle in the first position.

12. The transfer switch arrangement of claim 3, wherein the interior of the housing includes a wall to which the selector switch is mounted, and wherein the interior of the housing defines a recess adjacent the wall, wherein the recess is configured to receive the input receptacle inwardly of the wall when the cover is in the closed position and the input receptacle is in the second position.

13. The transfer switch arrangement of claim 12, wherein the input receptacle comprises a socket secured to a socket mounting wall that extends inwardly from the inner surface of the cover, wherein the socket mounting wall is configured such that the socket faces downwardly when the cover is in the closed position and faces outwardly when the cover is in the open position.

14. The transfer switch arrangement of claim 1, further comprising a mounting flange arrangement on the housing for mounting the housing within an opening in a control box enclosure.

15. A transfer switch arrangement adapted for interconnection in a power supply system for an electrical load, for selectively switching power to the electrical load, the transfer switch comprising:
a housing defining an interior, and including movable cover means that is movable between an open position for providing access to the interior of the housing and a closed position for preventing access to the interior of the housing;
an input receptacle means for engaging an electrical connector, wherein the input receptacle means is movably interconnected with the housing for movement between a first, outwardly facing position for facilitating engagement of the connector with the receptacle when the cover is in the open position, and a second, downwardly facing position when the cover is in the closed position;
an auxiliary power supply associated with the electrical connector, wherein the auxiliary power supply supplies power to the electrical load through the input receptacle and the electrical connector; and
transfer switch means contained within the interior of the housing for controlling the supply of power from the auxiliary power supply through the input receptacle and the electrical connector.

16. The transfer switch arrangement of claim 15, wherein the input receptacle means is secured to and movable with the cover means so that the input receptacle means is in the first, outwardly facing position when the cover means is in the open position and the input receptacle means is in the second, downwardly facing position when the cover means is in the closed position.

17. The transfer switch arrangement of claim 16, wherein the cover means is movable between the open position and the closed position by pivot connection means interposed between the housing and the cover means.

18. The transfer switch arrangement of claim 17, further comprising frictional means interposed between the housing and the cover means for releasably maintaining the cover means in the open position.

19. The transfer switch arrangement of claim 16, wherein the input receptacle means is carried by the cover means and is movable from the second, downwardly facing position to the first, outwardly facing position when the cover means is moved to the open position, and wherein the input receptacle means is movable from the first, outwardly facing position to the second, downwardly facing position when the cover means is moved to the closed position.

20. A transfer switch arrangement for selectively switching the supply of electrical power to a load between a primary power source and an alternate power source, comprising:
a housing defining an interior:
a cover pivotably interconnected with the housing, wherein the cover is movable between an open position for selectively providing access to the housing interior and a closed position for selectively preventing access to the housing interior;
a selector switch arrangement within the interior of the housing, wherein the selector switch arrangement includes selector switch mounting structure defining an enclosed area within the interior of the housing for providing connections between the primary power source, the alternate power source, the electrical load and one or more selector switches;
an input receptacle interconnected with the cover, wherein the input receptacle includes a socket for engaging an electrical connector associated with the alternate power source, and is movable in response to movement of the cover, wherein the input receptacle is movable between a downwardly facing position when the cover is in the closed position and an outwardly facing position when the cover is in the open position;
wherein the input receptacle and the selector switch mounting structure are configured and arranged such that the input receptacle is located alongside the selector switch mounting structure when the cover is in the closed position and the input receptacle is in the downwardly facing position.

21. The transfer switch arrangement of claim 20, wherein the housing interior defines a recess adjacent the selector switch mounting structure within which the input receptacle is movable when the cover is moved between the open and closed positions.

22. The transfer switch arrangement of claim 20, wherein the electrical connector is located at a distal end of a power supply cord that is interconnected with the alternate power supply, wherein the cover and the housing define a cooperating opening arrangement that enables the cord to pass from the interior of the housing when the electrical connector is engaged with the socket and the input receptacle is in the downwardly facing position.

* * * * *